(12) United States Patent
Yamaura (10) Patent No.: US 6,662,295 B2
(45) Date of Patent: *Dec. 9, 2003

(54) METHOD AND SYSTEM DYNAMICALLY PRESENTING THE BRANCH TARGET ADDRESS IN CONDITIONAL BRANCH INSTRUCTION

(75) Inventor: Shinichi Yamaura, Kobe (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/151,055

(22) Filed: Sep. 10, 1998

(65) Prior Publication Data

US 2001/0044892 A1 Nov. 22, 2001

(30) Foreign Application Priority Data

Sep. 10, 1997 (JP) .............................. 9-245603

(51) Int. Cl.[7] .............................................. G06F 9/38
(52) U.S. Cl. ..................... 712/234; 712/233; 712/235
(58) Field of Search ................. 712/233–240, 712/4, 201, 23, 34, 202, 214; 711/143, 171, 202

(56) References Cited

U.S. PATENT DOCUMENTS 5,274,776 A * 12/1993 Senta ........................ 712/229
5,453,927 A * 9/1995 Matsuo ...................... 712/235
5,659,752 A * 8/1997 Heisch et al. ................. 717/4
5,664,135 A * 9/1997 Schlansker et al. ......... 712/201
5,724,563 A * 3/1998 Hasegawa ................... 712/233
5,768,610 A * 6/1998 Pflum .......................... 712/23
5,805,878 A * 9/1998 Rahman et al. ............. 712/239
5,848,269 A * 12/1998 Hara .......................... 712/239
5,949,995 A * 9/1999 Freeman ..................... 712/239
6,233,679 B1 * 5/2001 Holmberg ................... 712/240

FOREIGN PATENT DOCUMENTS

| JP | 63-147230 | 6/1988 |
|---|---|---|
| JP | 1-239638 | 9/1989 |
| JP | 2-35525 | 2/1990 |
| JP | 3-257628 | 11/1991 |
| JP | 4-11237 | 4/1992 |

OTHER PUBLICATIONS

"Advanced Computer Architectures, A Design Space Approach," Deszo Sima et al., Addison Wesley, pp272–277, pp295–361 1997–month omitted.

* cited by examiner

Primary Examiner—Wen-Tai Lin
(74) Attorney, Agent, or Firm—Cooper & Dunham LLP (57) ABSTRACT

The present invention is related to branch instructions in a pipeline process of a microprocessor system. The microprocessor system executes branch prediction if a conditional branch instruction code calls for branch prediction, and on the other hand, suspends successive instruction execution until a branch evaluation of the conditional branch instruction settles if the conditional branch instruction code does not call for branch prediction.

11 Claims, 4 Drawing Sheets

F: FETCH, D: DECODE, M: MEMORY, E: EXECUTION
WB: WRITE BACK

F I G. 1
PRIOR ART

F: FETCH, D: DECODE, M: MEMORY, E: EXECUTION
WB: WRITE BACK

METHOD AND SYSTEM DYNAMICALLY PRESENTING THE BRANCH TARGET ADDRESS IN CONDITIONAL BRANCH INSTRUCTION

FIELD OF THE INVENTION

This invention is generally related to a method and system for high performance implementation of a microprocessor and more particularly, to branch instructions in a pipeline process of a microprocessor.

BACKGROUND OF THE INVENTION

In a field of computer technologies, many excellent technologies have developed during the past few decades.

Particularly, microprocessors have progressed a quantum leap over other fields of technology. The microprocessors have achieved phenomenally high performance, high speed and so on. One way to improve even more on the performance of the microprocessor, is to reduce the number of cycles required to execute an instruction by overlapping the execution of multiple instructions.

Figure 1:
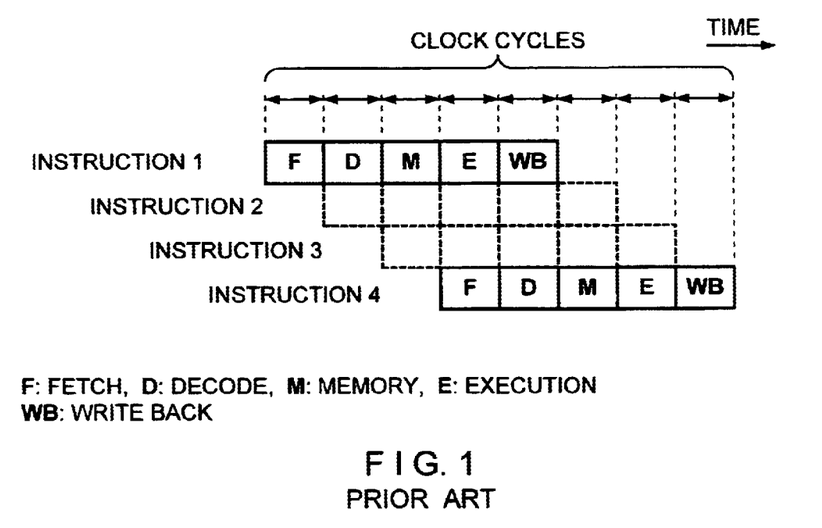
FIG. 1 is a diagram showing a timing of a conventional system for processing pipelined instructions.

Referring to FIG. 1, a pipeline process simultaneously executes overlapped multiple instructions. Consequently, the pipeline process is capable of starting an execution of the next instruction before the execution of one instruction finishes.

As the above process, there are singlescalar and superscalar techniques that are capable of carrying out overlapped multiple instructions by plural pipeline.

The above-noted superscalar technique is a high performance implementation technique of microprocessors that simultaneously executes overlapped portions of plural instructions within one clock in one machine cycle.

Some of the technologies used to improve on the superscalar technique are referred to as registration rename, out-of-order execution, branch instructions, and speculative execution and so on.

Figure 2:
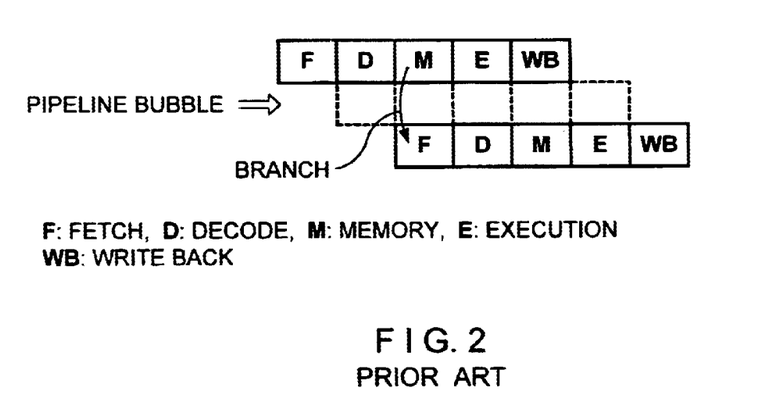
FIG. 2 is a diagram illustrating a pipeline bubble caused by a conventional branch instruction in the pipelined instructions.

However, a disadvantage of these techniques is that a spoiled pipeline, called pipeline bubble, can occur. Referring to FIG. 2, the instruction pipelines of the above types that are single scalar and superscalar typically have some branch instructions. The branch instructions usually delay the instruction pipeline because of the following reasons.

The first reason is that the processor must decide the branch condition. However, the microprocessor can not decide the branch condition until an instruction for deciding a condition, such as the instruction for changing a zero flag, finishes. Particularly, the decision regarding the condition can be extremely delayed in the superscalar technique because the superscalar simultaneously issues a lot of instructions.

The second reason is that the processor must also calculate the effective destination of the branch and fetch the instruction. When a cache access requires an entire cycle, and the fetched branch instruction specifies the target address, performance of this fetch without delaying the pipeline for at least one pipe stage is impossible. Furthermore, conditional branches may cause further delays because they require the calculation of a condition, as well as the target address. Therefore, branch instructions are delayed and do not take effect until after one or more instructions immediately following the branch instructions have been executed.

The calculation of the branch target address finishes within about one cycle. Therefore, the above-described first reason becomes a problem in comparison with the second reason. In the decision of the branch condition, speculative execution becomes more effective. Therefore, this speculative execution has great value in the superscalar.

A technology used for solving the above described pipeline bubble is referred to as a branch prediction technique. When the branch instructions exist, pipeline bubbles inevitably occur in the pipeline process because of the above reasons.

Some methods of branch prediction based upon conditional branch instructions are disclosed in Japanese Laid Open patent applications No. 63-147,230, 01-239,638 and 04-112,327. These methods of branch prediction predict whether to perform the conditional branch instruction according to the last occurrence of the conditional branch instruction and based thereon, either execute the conditional branch instruction or do not execute the conditional branch instruction before the judgement is made whether the condition for the conditional branch instruction is satisfied. In detail, the microprocessor system has a branch history table that stores and pairs the branch target address for destination of the branch instruction with the address corresponding to the conditional branch instruction according to the last occurrence of the conditional branch instruction. When the above conditional branch instruction is re-executed, the microprocessor system carries out the branch instruction before calculation of the target address for destination of the branch instruction by using the stored address for destination of the branch instruction stored in the branch history table.

In the conditional branch instruction and also noncondition branch instruction, it is necessary to perform a process which adds an address for destination of the branch instruction which is a relative address to a value of a program counter, in order to obtain an actual address for destination of the branch instruction so that the target address for destination of the branch instruction is a relative address.

On the other hand, if the microprocessor system employs an absolute address, the above calculation is not necessary. However, the microprocessor system still needs the above branch history table in order to store the absolute address for destination of the branch instruction.

The above-described branch prediction is capable of executing high-speed operation if the branch prediction matches a suitable branch instruction, namely if the branch instruction is taken.

However, the present inventor identified that if the branch prediction is not taken, the system needs to invalidate the executed instruction after identifying that a predicted branch instruction is not to be taken. The invalidating operation requires machine cycles. Therefore, the above invalidating operation inhibits the efficiency of the microprocessors.

Furthermore, the present inventor also identified that the conventional branch prediction techniques have a branch history table which stores predicted values which indicate the last occurrence of the conditional branch instructions for all conditional branch instructions and branch target addresses when the conditional branch instruction is executed. Therefore, hardware of the system becomes large scale, and also expensive. Furthermore, when a microprocessor system does not execute the branch prediction, although the system does not become expensive, the process speed becomes low in comparison with the processor in which the branch prediction is executed. This is because the microprocessor system cannot execute the next instructions until it becomes clear whether the condition for performing the conditional branch instruction has been satisfied.

The above mentioned branch instructions are disclosed, for example, in "ADVANCED COMPUTER ARCHITECTURES, a design space approach, p272–p360, Deszo Sima et al, Addison Wesley". The contents of this reference being incorporated herein by reference.

SUMMARY OF THE INVENTION

To solve the above and other problems, according to one aspect of the present invention, a method for processing branch instructions in a pipeline process of a microprocessor system has the steps of determining whether a conditional branch instruction code correspond to branch prediction and executing branch prediction if the conditional branch instruction code corresponds to branch prediction.

According to another aspect of the present invention, the method has a further step of suspending execution of successive instruction until a branch evaluation of the conditional branch instruction finishes, if said conditional branch instruction code does not correspond to branch prediction.

According to another aspect of the present invention, the method further comprises the steps of: assuming a branch address data in said conditional branch instruction to be an actual branch target address in the case that the conditional branch instruction code corresponds to branch prediction; and assuming an address which is the sum of the branch address data and a count value of a program counter to be an actual branch target address in the case that the conditional branch instruction code does not correspond to branch prediction.

According to another aspect of the present invention, a method for processing branch instructions in a pipeline process of a microprocessor system comprises the steps of determining whether a conditional branch instruction code corresponds to branch prediction according to a prescribed bit in the conditional branch instruction code, which indicates whether branch prediction is effective, and executing branch prediction if said predicted bit corresponds to branch predictions, and suspending execution of successive instructions until a branch evaluation of the conditional branch instruction finishes if the conditional branch instruction code does not correspond to branch prediction.

According to another aspect of the present invention, a microprocessor system which processes branch instructions in a pipeline process, includes a branch prediction unit configured to detect a prescribed bit corresponding to effective branch prediction code in a conditional branch instruction code and determine whether the conditional branch instruction code corresponds to a branch prediction code according to the prescribed bit corresponding to the effective branch prediction code, and a branch prediction controller coupled to the branch prediction unit and configured to execute branch prediction if the conditional branch instruction code corresponds to branch prediction.

According to another aspect of the present invention, the branch prediction controller is configured to suspend successive instructions until a branch evaluation of the condition branch instruction finishes, if the conditional branch instruction code does not correspond to branch prediction.

According to another aspect of the present invention, the branch prediction controller is configured to assume that branch address data in the conditional branch instruction code is an actual branch target address in the case that the conditional branch instruction code corresponds to branch prediction and assume that an address which is a sum of the branch address data to a count value of a program counter is an actual branch target address in the case that the conditional branch instruction code does not correspond to branch prediction.

According to another aspect of the present invention, the conditional branch instruction code includes a branch prediction effective bit which corresponds to whether a branch prediction unit should predict the branch target address.

BRIEF DESCRIPTION OF THE DRAWINGS

Other aspects and further features of the present invention will become apparent from the following detailed description when read in conjunction with the accompanying drawings, wherein.

DESCRIPTION OF THE PREFERRED EMBODIMENT

A description will now be given of preferred embodiments according to the present invention.

Figure 3:
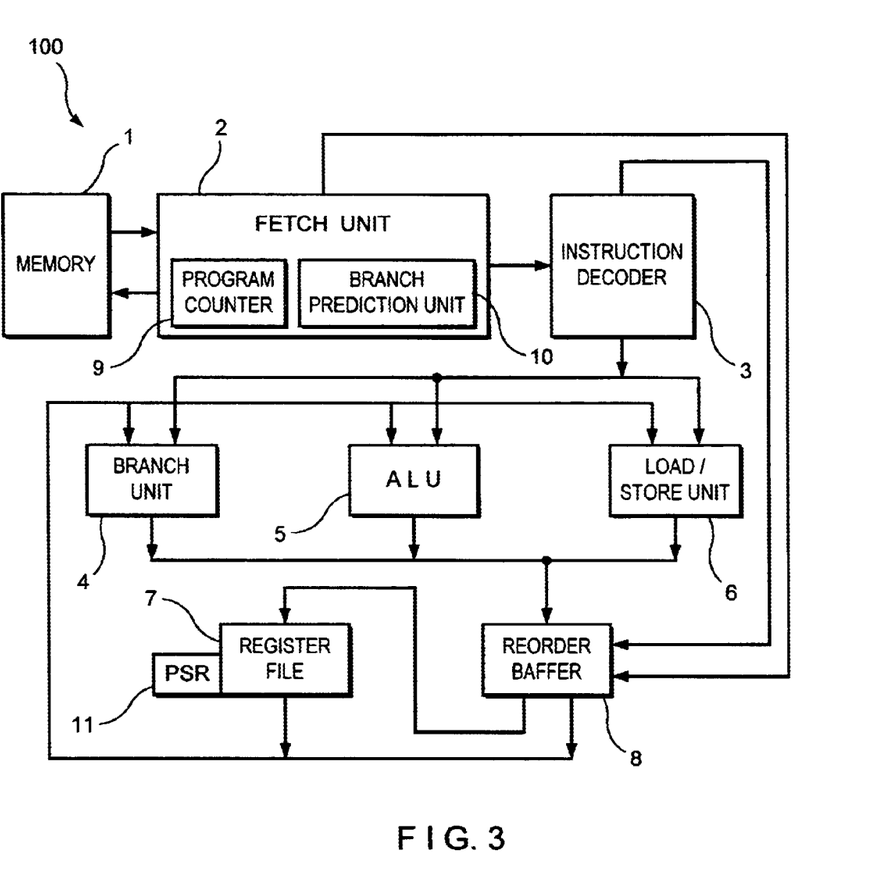
FIG. 3 is a block diagram of a microprocessor system according to the present invention.

Reference will now be made to the drawings, wherein like reference numerals designate like or similar elements throughout the views. Referring to FIG. 3, a first preferred embodiment of the microprocessor system for performing branch instructions in a pipeline process will be described.

A superscalar type microprocessor system 100 is made up of a memory 1, a fetch unit 2, an instruction decoder 3, a branch unit 4, an arithmetic logic unit (ALU) 5, a load/store unit 6, a register file 7 and a reorder buffer 8.

The memory unit 1 stores programs for control of the above microprocessor 100 or various kinds of data.

The fetch unit 2 is equipped with a program counter 9 and a branch prediction unit 10. The fetch unit 2 generates addresses according to a count value of the program counter 9 and sends the addresses to the memory unit 1. Furthermore, the fetch unit 2 receives the stored data or programs in the memory unit 1 and temporarily stores them. The branch prediction unit 10 decides whether or not it should execute branch prediction.

Figure 4:
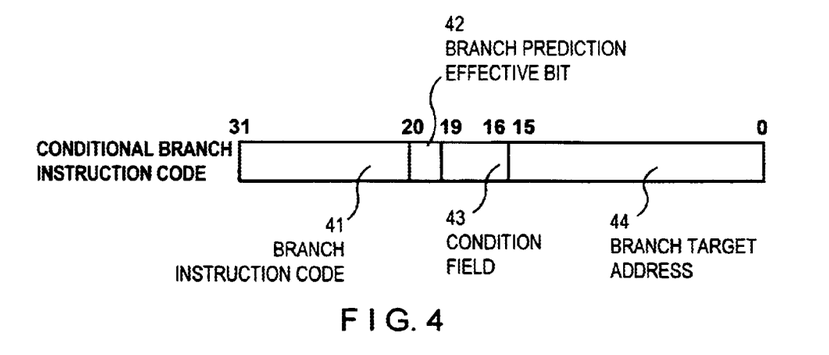
FIG. 4 is a diagram for illustrating a structure of a conditional branch instruction code that includes an absolute address according to the present invention.

Referring to FIG. 4, a code of the conditional branch instruction includes branch instruction code 41, branch prediction effective bit 42, conditional field 43, and branch target address 44.

The branch prediction unit 10 detects the branch prediction effective bit 42 of the conditional branch instruction and regards the conditional branch instruction as a branch prediction instruction when the value of the branch prediction effective bit 42 is "1". The branch prediction unit 10 regards the conditional branch instruction as a non-branch prediction instruction when the value of the branch prediction effective bit 42 is "0".

The basic branch instruction employed by the present embodiment is disclosed in the above-noted publication "ADVANCED COMPUTER ARCHITECTURES."

To achieve branch prediction, according to an embodiment of the present invention, the system is equipped with a branch history table which has stored therein information indicating a relation between a branch target address and an actual address of each of various branch instructions that have been issued, in which a current branch instruction is processed based on the recorded execution history of the branch instructions. The current branch instruction is executed based upon the target address stored in the branch history table before the calculation of the target address identified in the branch instruction. The detailed embodiment describing whether branch prediction is executed or not is described later. The fetch unit 2 continues fetching the successive instructions after the conditional branch instruction, and only suspends the fetch when the result of conditional evaluation becomes clear.

The instruction decoder 3 decodes the received instruction from the fetch unit 2 and sends the decoded data to the branch unit 4, the ALU 5 and the load/store unit 6. When the received instruction is a conditional branch instruction, the instruction decoder 3 issues the conditional branch instruction and sends the instruction to the branch unit 4. When the branch prediction unit 10 in the fetch unit 2 executes branch prediction, the instruction decoder 3 receives the data corresponding to the branch prediction from the fetch unit 2 and transfers the data to the branch unit 4.

The branch unit 4 executes a branch evaluation, when the branch unit 4 receives the conditional branch instruction from the instruction decoder 3 and data needed for evaluation is available. The branch unit 4 suspends a process of branch evaluation until the data needed for evaluation is available.

In the case that the conditional branch instruction is regarded as a branch instruction, when a zero flag of a processor status register 11 of the register file 7 is "1", an operation for changing the zero flag is performed before executing the branch instruction, and the branch evaluation is suspended until a value of a zero flag is fixed. The target address evaluated by the branch evaluation is then sent to the fetch unit 2 by the branch unit 4.

When branch prediction is executed, the branch unit 4 evaluates whether the predicted target address is taken or not taken by comparing the predicted target address from the instruction decoder 3 with the actual target address obtained by the determination process.

If branch prediction is not taken, the branch unit 4 sends the actual target address to the fetch unit 2.

In detail, when the oldest one of the incomplete instructions in the reorder buffer 8 is a branch instruction, the reorder buffer 8 sends the oldest one to the branch unit 4. In the branch unit 4, when the branch instruction branches off using the predicted step, in other words, branch prediction is taken, termination of the instruction is stored in the reorder buffer 8. On the other hand, when branch prediction is not taken, the program counter 9 in the fetch unit 2 is provided with the actual target address after confirmation that the instructions before the branch instruction are completed.

The ALU 5 executes the logical calculation according to the decoded data from the instruction decoder 3. And then, the load/store unit 6 executes the load or store instruction according to the decoded data from the instruction decoder 3.

The reorder buffer 8 receives terminate data of the load or store instruction from the load/store unit 6, a computation result from the ALU 5, and data corresponding to whether branch prediction is taken or not from the branch unit 4. The reorder buffer 8 records the instruction fetched in the fetch unit 2. When the reorder buffer 8 receives information that the conditional branch instruction is issued from the instruction decoder 3, the reorder buffer 8 records the data corresponding thereto under the issue of the branch instruction. Furthermore, the reorder buffer 8 transfers the result of the instruction that finished in order from the oldest instruction to the register file 7. When an incomplete instruction is found in the reorder buffer 8, the reorder buffer 8 discontinues transferring the result to the register file 7. At this time, when the oldest incomplete instruction is a branch instruction, the branch instruction is sent to the branch unit 4.

The register file 7 stores the data provided from the reorder buffer 8.

Now, referring to FIGS. 4 and 5, a preferred embodiment of the conditional branch instruction of the above-described microprocessor system according to the present invention will be described. When the instruction fetched by the fetch unit 2 is a conditional branch instruction, the branch prediction unit 10 evaluates whether it should execute branch prediction according to a branch prediction effective bit 42 of the conditional branch instruction code.

In the case that the branch instruction is evaluated by the branch prediction unit 10 in the fetch unit 2, the fetch unit 2 fetches an instruction according to the target address predicted by branch prediction. At first, the fetched instruction is sent to the instruction decoder 3. The instruction decoder 3 decodes the fetched instruction and sends the predicted target address as a result of the branch prediction in conjunction with issue of the branch instruction to the branch unit 4 when the instruction received from the fetch unit 2 is a conditional branch instruction. In addition, the instruction decoder 3 also records the branch instruction under issue in the reorder buffer 8.

The branch unit 4 executes evaluation of the branch in both a case that the branch prediction unit 10 executes branch prediction and a case that branch prediction is not executed. When branch prediction is executed, the fetch unit 2 considers the branch instruction complete, and executes the successive instructions following the branch instruction. The succession of instructions is recorded in the reorder buffer 8. Furthermore, information regarding the successive instructions that have been processed by the branch unit 4, the ALU 5 and the load/store unit 6 are transferred to and stored in the reorder buffer 8. The reorder buffer 8 transfers results of the completed instructions in order starting from old instructions.

When incomplete instructions are found in the reorder buffer 8, transfer of data for the incomplete instruction to the register file 7 is suspended. The instruction is sent to the branch unit 4 when the oldest incomplete instruction is a branch instruction. The branch unit 4 records the branch instruction as a termination instruction in the reorder buffer 8 when branch prediction is taken.

However, when branch prediction is not taken, an actual target address is directed to the fetch unit 2 after execution of an instruction preceding the branch instruction is confirmed according to an acknowledge from the reorder buffer 8.

When the fetched instruction is a conditional branch instruction which does not call for branch prediction, decodes or fetches following this conditional branch instruction are discontinued. The instruction decoder 3 issues the above conditional branch instruction to the branch unit 4. The branch unit 4 transfers evaluation of the conditional branch to the fetch unit 2 after data for the evaluation of the conditional branch are obtained. The fetch unit 2 restarts the fetch according to the evaluation of the conditional branch. Likewise, the instruction decoder 3 also restarts to decode according to the evaluation of the conditional branch. In this case, the microprocessor system executes the instruction corresponding to the target address before the instructions preceding the branch instruction are executed completely.

The microprocessor system just described does not execute branch prediction for all conditional branch instructions and only executes branch prediction for specified conditional branch instructions.

Branch prediction lends itself to execute loop operations that carry out repeated execution of the same instruction. On the other hand, branch prediction does not lend itself to execute a process in which a target branch is changed each time.

Therefore, in cases that lend themselves to execution of branch prediction, the branch prediction effective bit 42 of a conditional branch instruction should be "1" corresponding to branch prediction in the programming of the microprocessor system. And then in the cases that do not lend themselves to execution of branch prediction, the branch prediction effective bit 42 of the conditional branch instruction should be "0" corresponding to non-branch prediction in the programming of the microprocessor system.

Accordingly, in the microprocessor system, branch prediction is executed for conditional branch instructions in which branch prediction is effective. On the other hand, branch prediction is not executed for a conditional branch instruction in which branch prediction is not effective.

When a microprocessor system executes branch prediction for all conditional branch instructions, storing and pairing branch target address as a destination of the branch instruction with address corresponding to the branch instruction in the branch history table is required for each conditional branch instruction. Consequently, the hardware is expensive and also large in size.

However, the present invention does not need such large sized branch history table and only needs a branch history table with a minimum size.

Figure 5:
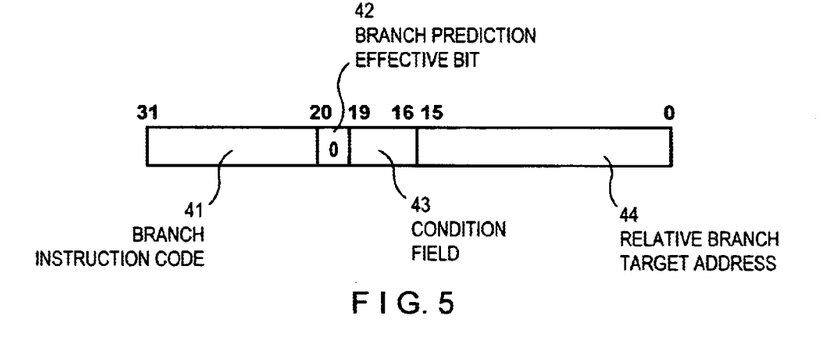
FIG. 5 is a diagram for illustrating a structure of a conditional branch instruction code that includes a relative address according to the present invention.

Referring to FIGS. 4 and 5, a second embodiment of the present invention is described. There are two kinds of branch target addresses, which correspond to an absolute address type and a relative address type, respectively. The absolute address is an address corresponding to a successive instruction. On the other hand, the relative address is not an address corresponding to the successive instruction. When relative addressing is selected, an address that is a sum of the relative address with a count value of the program counter 9 becomes the address corresponding to the successive instruction. The relative address has a merit when code size is small because the branch target address is conventionally located near the address of the branch instruction. Therefore; the above-described embodiment employs the relative address.

However, because summing processes are required in the case of employing the relative address, the summing processes become an inhibiting factor for a high performance implementation.

Further, it is necessary to store the results of the addition of the relative address to the count value of the program counter 9 in the branch history table.

When the microprocessor system employs absolute addressing, the system has a demerit that program size becomes large while absolute addressing has a merit in that it does not need the addition operation for determining the address.

Branch evaluation for a conditional branch instruction that does not call for branch prediction can not be carried out until data for the branch evaluation is available. Hence, while data for the branch evaluation line up, the microprocessor system calculates the addition of the relative address. In the above case, a delay of instructions does not occur, although calculation of the addition for the relative address becomes necessary. And then the microprocessor system eliminates the need for temporarily storing data in the branch history table.

Therefore, the second embodiment employs a conditional branch instruction that has a branch prediction bit which is described as follows.

The branch prediction effective bit 42 is "0" and a relative address is indicated in a branch target address of the conditional branch instruction code for an instruction that does not call for branch prediction.

On the other hand, the branch prediction effective bit is "1" and the absolute address is indicated in the branch target address of the conditional branch instruction code for an instruction that calls for branch prediction.

The branch prediction effective bit is appropriately set in each case during programming or compiling.

Therefore, in the case of a conditional branch instruction code that calls for branch prediction, the microprocessor system assumes that an address in the conditional branch instruction code is the actual branch target address. On the other hand, in a case of the conditional branch instruction code that does not call for branch prediction, the microprocessor system assumes that an address which is a sum of an address in the conditional branch instruction code and a value of the program counter is the actual branch target address.

Figure 6:
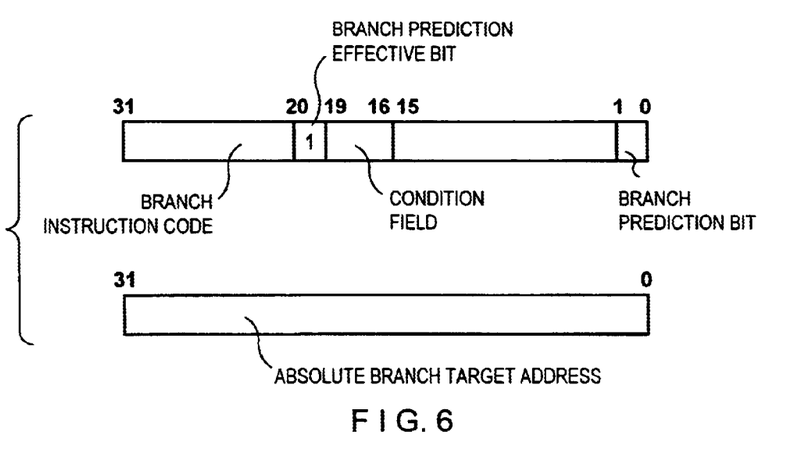
FIG. 6 is a diagram for illustrating a structure of a conditional branch instruction code that includes a branch prediction bit according to the present invention.

Now referring to FIG. 6, a third embodiment of the present invention is described. A conditional branch instruction code includes a branch prediction bit. The branch prediction bit is a flag which indicates whether branching should be executed or not when the microprocessor system executes branch prediction. Therefore, when the microprocessor system executes branch prediction, the system evaluates whether or not branching should be performed according to the branch prediction bit.

When the conditional branch instruction calls for branch prediction and the branch prediction bit is "1", the system predicts and executes a branch function. If the branch prediction bit is "0", although the conditional branch instruction calls for branch prediction, the system executes the next instruction without branch.

In both processes above, the branch unit 4 performs issue of the branch instruction and the data whether branching is executed or not.

In the third embodiment, the branch prediction unit 10 becomes unnecessary in the microprocessor system because the branch prediction bit in the conditional branch instruction code is appropriately set at the time of programming of the microprocessor. Furthermore, use of the conditional branch instruction codes which have a branch target address corresponding to an absolute address is limited to instructions that call for branch prediction and absolutely predicting branching.

Therefore, the total program size of the microprocessor system is small.

Figure 7:
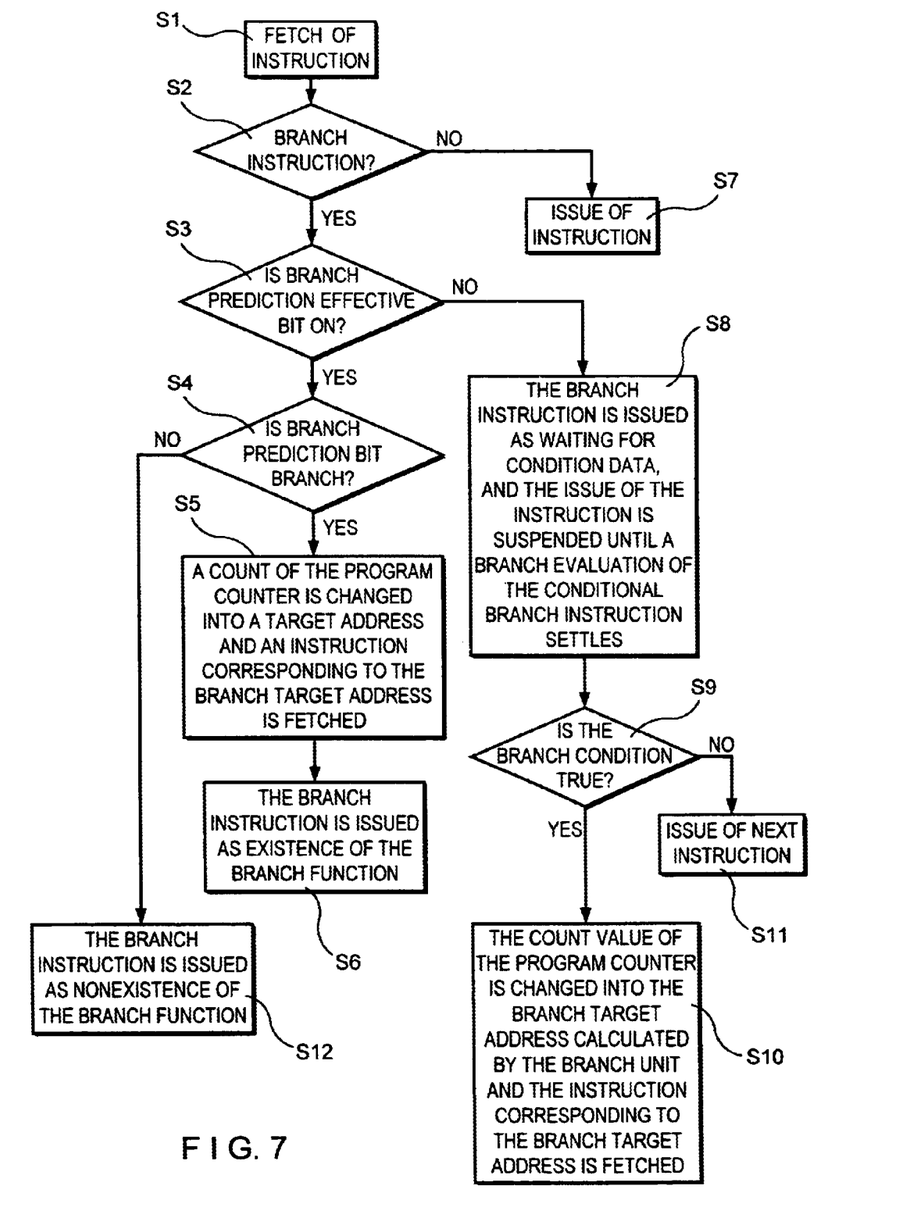
FIG. 7 is a flowchart of a process flow of a branch prediction method according to the present invention.

Furthermore, still referring to FIGS. 5 to 7, the conditional branch instruction code which is 32 bits has a relative branch target address of 16 bits. The system using the above code can employ a branch instruction that includes a relative address varying from the original value corresponding to the program counter in a range between −32,768 and 32,767.

Now referring to FIG. 7, a flowchart is presented that illustrates steps of a process employed in the present invention.

At step S1, data for an instruction is fetched from the memory unit 1. The process proceeds to step S2 in which the fetched data is evaluated to determine whether a branch instruction exists. If the response to the inquiry in step S2 indicates that the fetched data is a branch instruction, the process proceeds to step S3. In step S3, the branch prediction effective bit in the conditional branch instruction is evaluated to determine whether the data calls for branch prediction. If the response to the inquiry in step S3 indicates that the branch prediction effective bit is "1", in other words, indicates branch prediction, the process proceeds to step S4. Furthermore, in step S4, the conditional branch instruction is evaluated to determine whether it calls for a branch function. If the response to the inquiry in step S4 indicates that the conditional branch instruction calls for a branch function, the process proceeds to step S5. In step S5, a count of the program counter is changed into a target address and an instruction corresponding to the branch target address is fetched. Then the branch instruction is issued as existence of the branch function in step S6.

On the other hand, if the response to the inquiry in the step S2 indicates that the fetched data is not a branch instruction, the process proceeds to step S7. The instruction corresponding to the fetched data is issued in step S7.

Further, if the response to the inquiry in the step S3 indicates that the branch prediction effective bit in the conditional branch instruction is "0", in other words, does not indicate branch prediction, the process proceeds to step S8. In step S8, the branch instruction is issued as waiting for condition data. That is, the issuance of the branch instruction is suspended until a branch evaluation of the conditional branch instruction is settled in the step S8 and the process proceeds to step S9. In step S9, it is judged whether the condition of the branch instruction is true. If the response to the inquiry in step S9 indicates the condition of the branch instruction is true, the process proceeds to step S10. In step S10, the count value of the program counter is changed to the branch target address calculated by the branch and the instruction corresponding to the branch target address is fetched.

On the other hand, if the response to the inquiry in the step S9 indicates that the condition of the branch instruction is not true, the process proceeds to step S11. In the step S11, the next instruction is issued.

In step S4, if the response to the inquiry in step S4 indicates that the conditional branch instruction does not call for a branch function, the process proceeds to step S12. In step S12, the branch instruction is issued as nonexistence of the branch function.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

The present document incorporates by reference the entire contents of Japanese priority document, 09-245,603 filed in Japan on Sep. 10, 1997.

What is claimed is:

1. A method for branch instructions in a pipeline process of a microprocessor system, comprising:

determining whether a conditional branch instruction code corresponds to a branch prediction, the conditional branch instruction code including a branch prediction bit; and executing the branch prediction if said conditional branch instruction code calls for branch prediction, and the predicted branch is taken when the branch prediction bit is set to a predetermined value, wherein absolute addressing is used when the conditional branch instruction code corresponds to a branch prediction and program counter relative addressing is used when the conditional branch instruction code does not correspond to a branch prediction.

2. The method of claim 1, further comprising:

suspending execution of a successive instruction until a branch evaluation of the conditional branch instruction finishes, if said conditional branch instruction code should not correspond to the branch prediction.

3. The method of claim 2, wherein when absolute addressing is used, it is assumed that a branch address data in said conditional branch instruction code is an actual branch target address if the conditional branch instruction code should correspond to the branch prediction and when program counter relative addressing is used, it is assumed that an address, which is formed by adding the branch address data to a program counter value, is an actual branch target address if the conditional branch instruction does not correspond to the branch prediction.

4. A microprocessor executing branch instructions in a pipeline process, comprising:

identifier means for identifying whether a conditional branch instruction code corresponds to a branch prediction based upon a branch prediction effective bit in the conditional branch instruction code, wherein the branch prediction is executed if the conditional branch instruction code calls for branch prediction, and a branch prediction bit is set to a predetermined value when a predicted branch is to be executed, wherein absolute addressing is used when the conditional branch instruction code corresponds to a branch prediction and program counter relative addressing is used when the conditional branch instruction code does not correspond to a branch prediction.

5. The microprocessor of claim 4, further comprising:

a branch prediction means for executing a branch prediction if said conditional branch instruction code corresponds to the branch prediction code.

6. The microprocessor of claim 5, wherein said branch prediction means suspends execution of a successive instruction until a branch evaluation of the conditional branch instruction finishes if said conditional branch instruction code does not correspond to the branch prediction code.

7. The microprocessor of claim 6, wherein when absolute addressing is used, it is assumed that a branch address data in said conditional branch instruction code is an actual branch target address when the conditional branch instruction corresponds to the branch prediction; and when program counter relative addressing is used, it is assumed that an address, which is formed by adding the branch address data to a program counter value, is an actual branch target address when the conditional branch instruction code does not correspond to the branch prediction.

8. A microprocessor system, comprising:

means for determining whether a conditional branch instruction code corresponds to a branch prediction, the conditional branch instruction code including a branch prediction bit; and means for executing the branch prediction if said conditional branch instruction code calls for branch prediction, and the predicted branch is taken when the branch prediction bit is set to a predetermined value, wherein absolute addressing is used when the conditional branch instruction code corresponds to a branch prediction and program counter relative addressing is used when the conditional branch instruction code does not correspond to a branch prediction.

9. The microprocessor of claim 8, wherein when absolute addressing is used, it is assumed that a branch address data in said conditional branch instruction code is an actual branch target address if the conditional branch instruction code should correspond to the branch prediction; and when program counter relative addressing is used, it is assumed that an address, which is formed by adding the branch address data to a program counter value, is an actual branch target address if the conditional branch instruction does not correspond to the branch prediction.

10. A method of executing branch instructions in a pipeline process, comprising:

identifying whether a conditional branch instruction code corresponds to a branch prediction based upon a branch prediction effective bit in the conditional branch instruction code, wherein the branch prediction is executed if the conditional branch instruction code calls for branch prediction, and a branch prediction bit is set to a predetermined value when a predicted branch is to be executed, wherein absolute addressing is used when the conditional branch instruction code corresponds to a branch prediction and program counter relative addressing is used when the conditional branch instruction code does not correspond to a branch prediction.

11. The method of claim 10, wherein when absolute addressing is used, it is assumed that a branch address data in said conditional branch instruction code is an actual branch target address when the conditional branch instruction corresponds to the branch prediction and when program counter relative addressing is used, it is assumed that an address, which is formed by adding the branch address data to a program counter value, is an actual branch target address when the conditional branch instruction code does not correspond to the branch prediction.

* * * * *